US 6,698,996 B2

(12) United States Patent
Smith, Jr.

(10) Patent No.: US 6,698,996 B2
(45) Date of Patent: Mar. 2, 2004

(54) TRUCK BED DESIGN FOR AUTOMOTIVE AND EQUIPMENT DELIVERY

(75) Inventor: Raymond E. Smith, Jr., Lake Forest, IL (US)

(73) Assignee: Up-N-Atom, Inc., Waukesha, WI (US)

( * ) Notice: Subject to any disclaimer, the term of this patent is extended or adjusted under 35 U.S.C. 154(b) by 27 days.

(21) Appl. No.: 09/818,446

(22) Filed: Mar. 27, 2001

(65) Prior Publication Data

US 2001/0031194 A1 Oct. 18, 2001

Related U.S. Application Data

(60) Provisional application No. 60/192,961, filed on Mar. 29, 2000.

(51) Int. Cl.⁷ .............................. B60P 1/04; B60P 1/43
(52) U.S. Cl. .................. 414/471; 414/469; 414/480; 414/494; 414/538; 296/183
(58) Field of Search .......................... 414/469, 471, 414/476, 480, 483, 494, 537, 538, 559, 477, 478; 296/37.6, 183

(56) References Cited

U.S. PATENT DOCUMENTS

| | | | | |
|---|---|---|---|---|
| 3,142,394 A | * | 7/1964 | Schwartz | 414/537 |
| 3,675,800 A | * | 7/1972 | Weyant et al. | 296/61 |
| 3,870,170 A | * | 3/1975 | Noble et al. | 14/69.5 |
| 4,260,315 A | | 4/1981 | Bouffard | |
| 4,456,420 A | * | 6/1984 | Newhard | 293/118 |
| 4,630,991 A | | 12/1986 | Landoll et al. | |
| 4,702,662 A | | 10/1987 | Marlett | |
| 4,770,592 A | | 9/1988 | Winter | |
| 4,842,470 A | * | 6/1989 | Hubbard | 296/182 |
| 5,051,053 A | | 9/1991 | Groeneweg | |
| 5,203,667 A | * | 4/1993 | Yoneda et al. | 414/477 |
| 5,234,308 A | * | 8/1993 | Mann | 296/57.1 |
| 5,257,894 A | * | 11/1993 | Grant | 414/537 |
| 5,263,807 A | | 11/1993 | Pijanowski | |
| 5,326,215 A | * | 7/1994 | Eberhardt | 410/29.1 |
| 5,388,949 A | * | 2/1995 | Berg | 280/405.1 |
| 5,509,639 A | * | 4/1996 | Ellis | 224/517 |
| 5,511,929 A | * | 4/1996 | Loftus | 212/180 |
| 5,662,453 A | | 9/1997 | Gerstner et al. | |
| 5,688,099 A | | 11/1997 | Fischer | |
| 5,816,767 A | * | 10/1998 | Mann | 14/71.7 |
| 5,853,280 A | | 12/1998 | Lohr | |
| 5,887,880 A | | 3/1999 | Mullican et al. | |
| 5,924,836 A | | 7/1999 | Kelly | |
| 6,276,890 B1 | * | 8/2001 | Pratt | 414/477 |

FOREIGN PATENT DOCUMENTS

| DE | 39 30 024 A1 | * | 3/1991 |
|---|---|---|---|
| WO | WO 91/03389 | * | 3/1991 |

* cited by examiner

Primary Examiner—James W. Keenan
(74) Attorney, Agent, or Firm—Cook, Alex, McFarron, Manzo, Cummings & Mehler, Ltd.

(57) ABSTRACT

The present invention is directed to a specialized truck bed wherein the bed is divided into two areas or deck sections connected by a transverse hinge. The invention is also directed to a winch system for use on a vehicle.

27 Claims, 21 Drawing Sheets

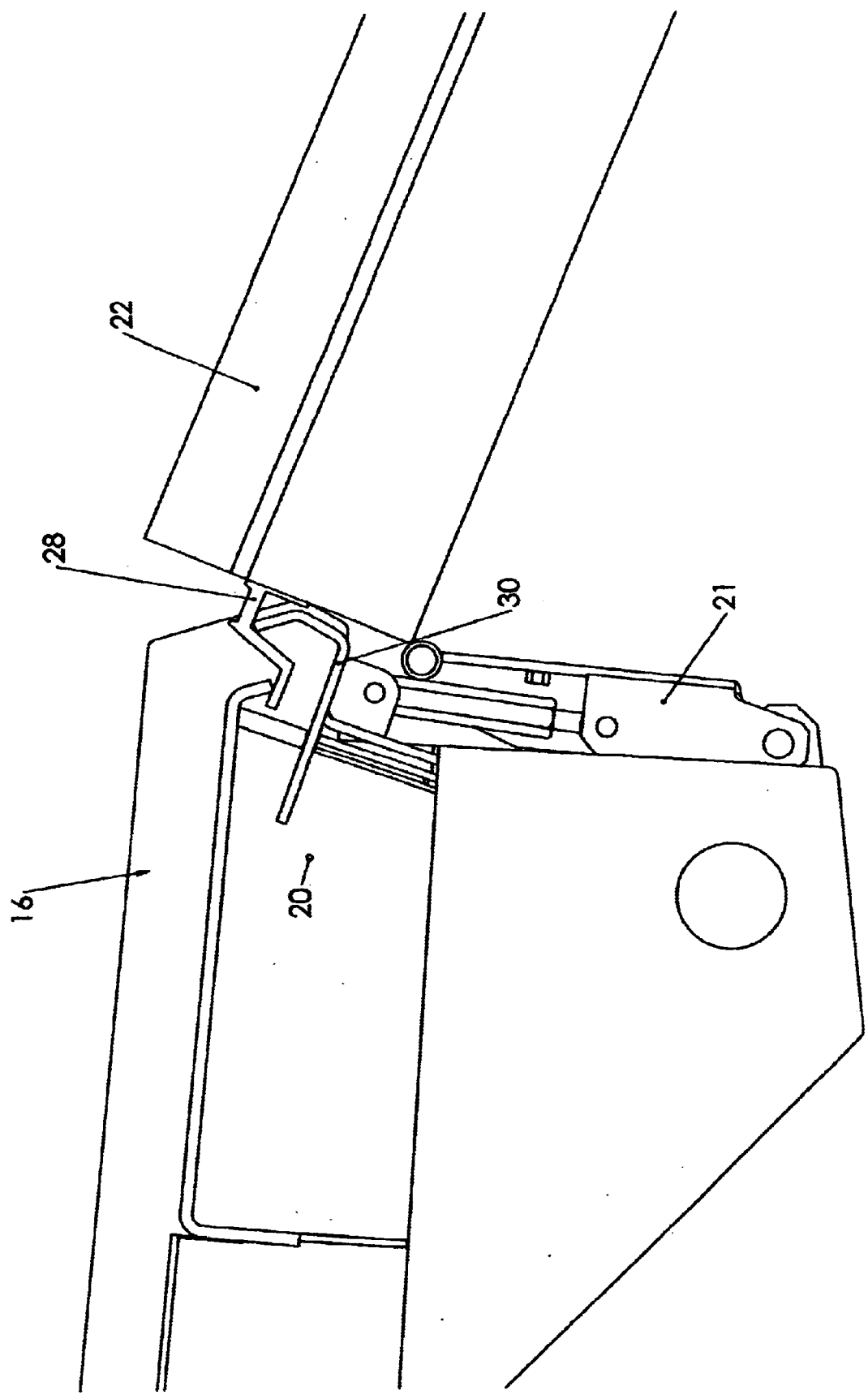

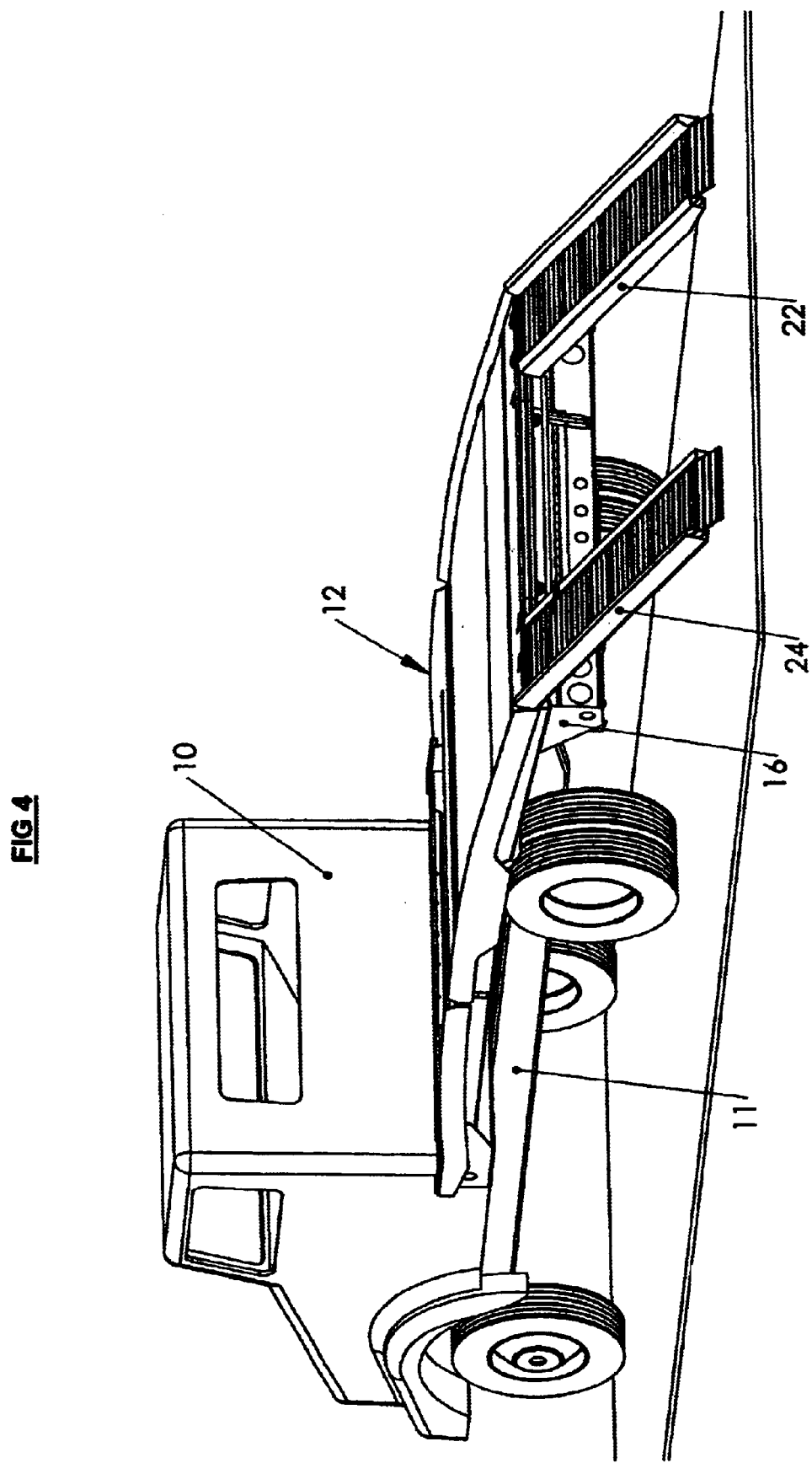

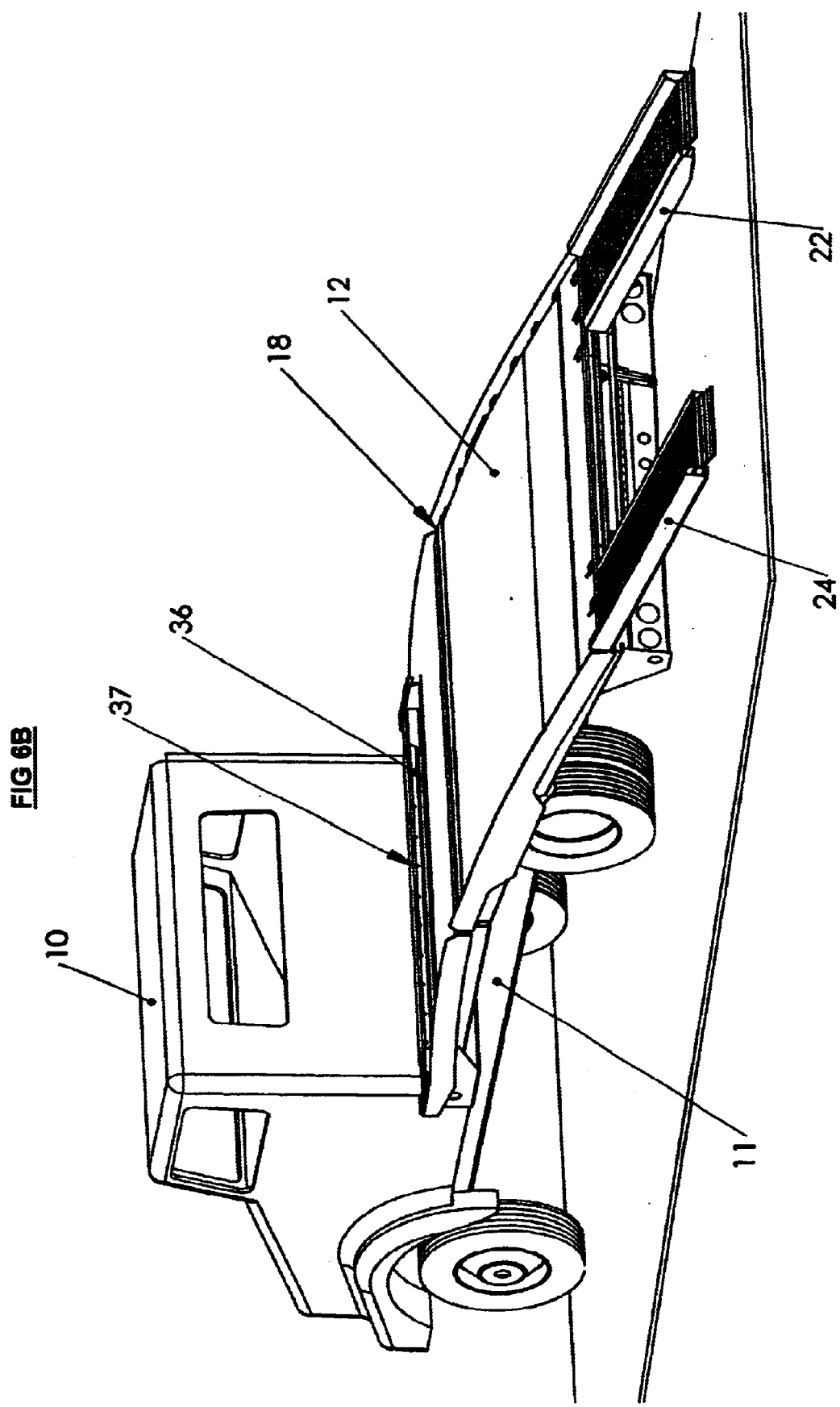

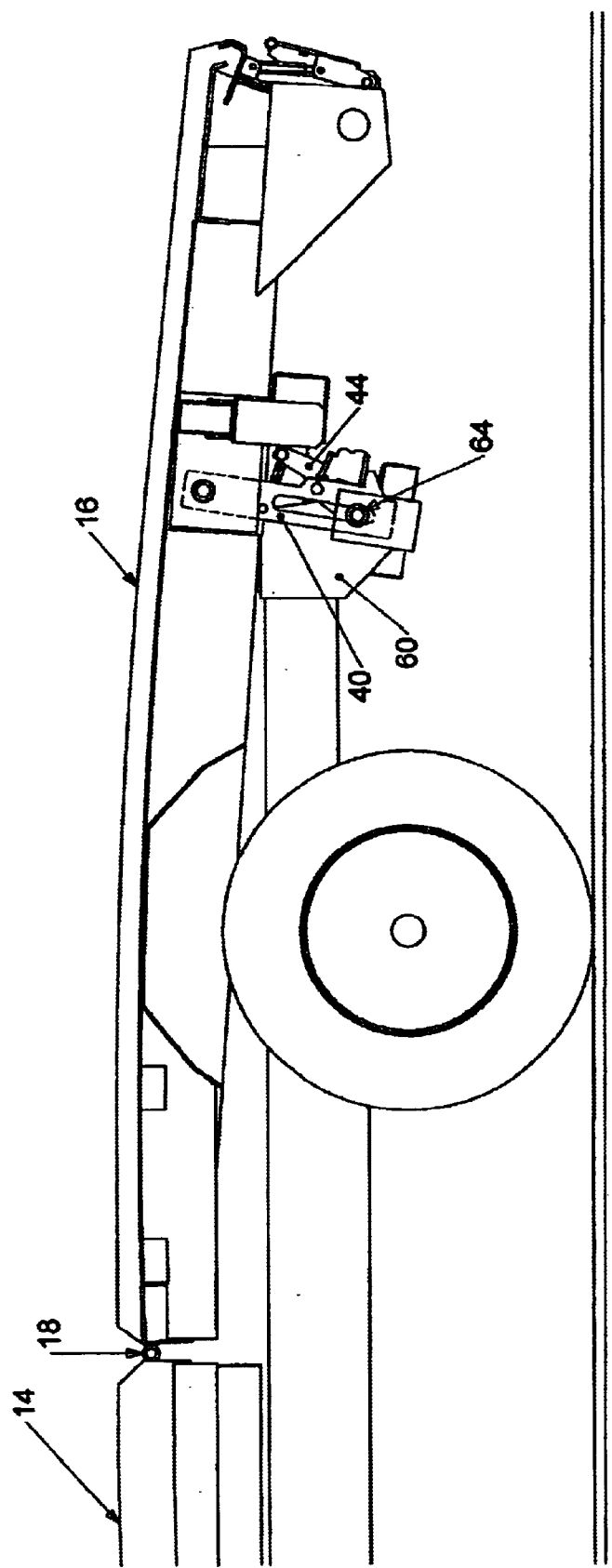

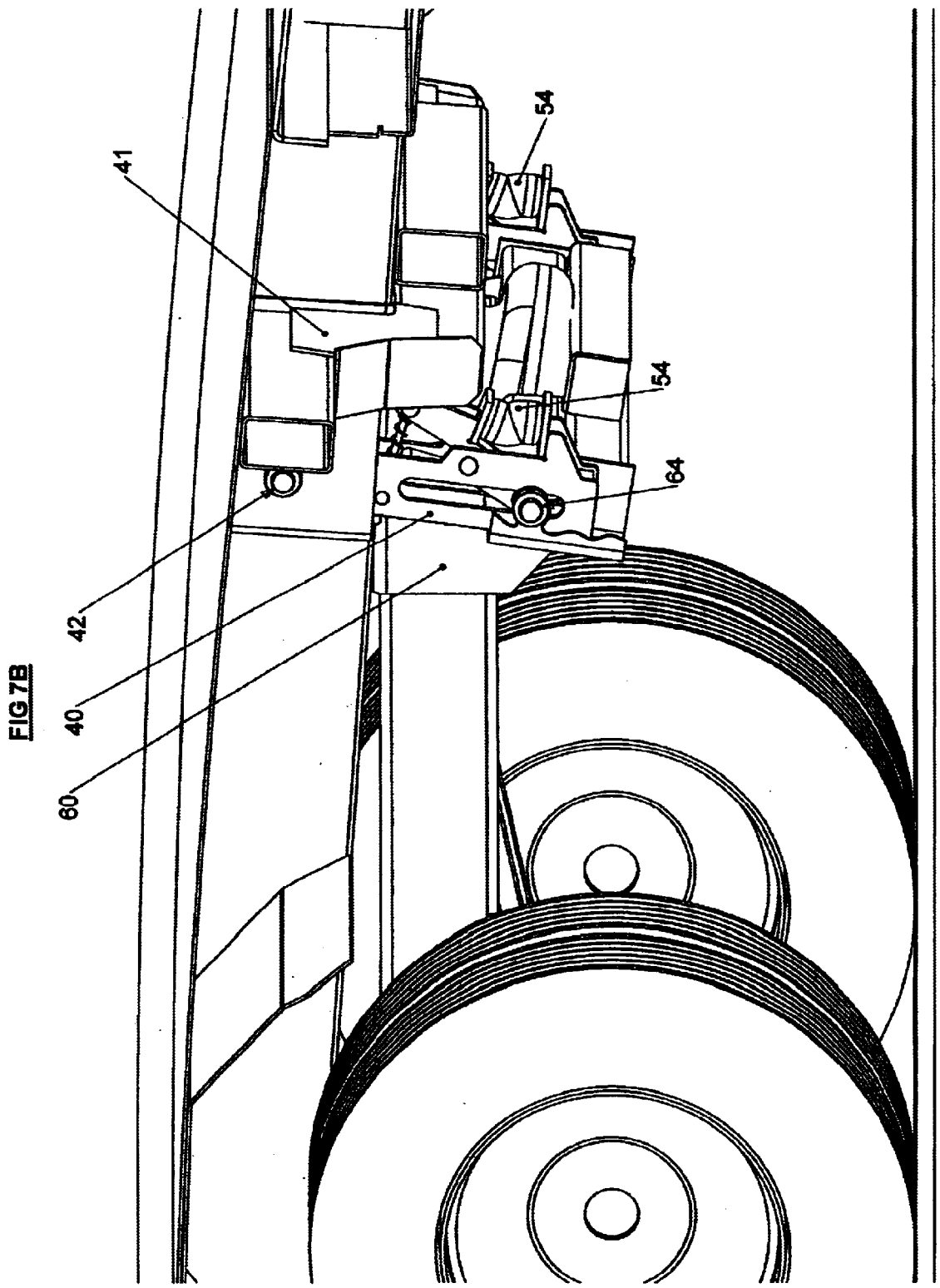

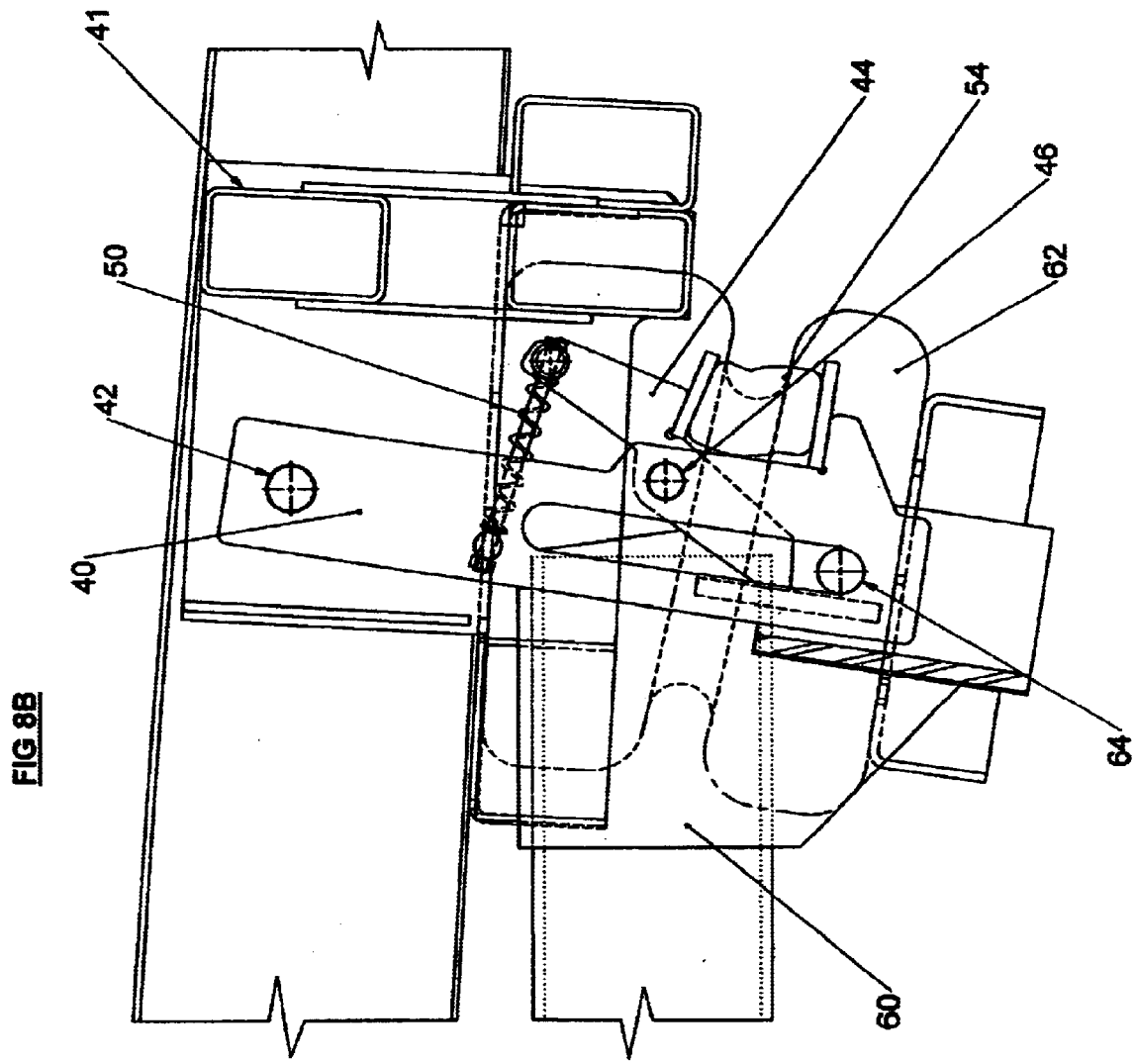

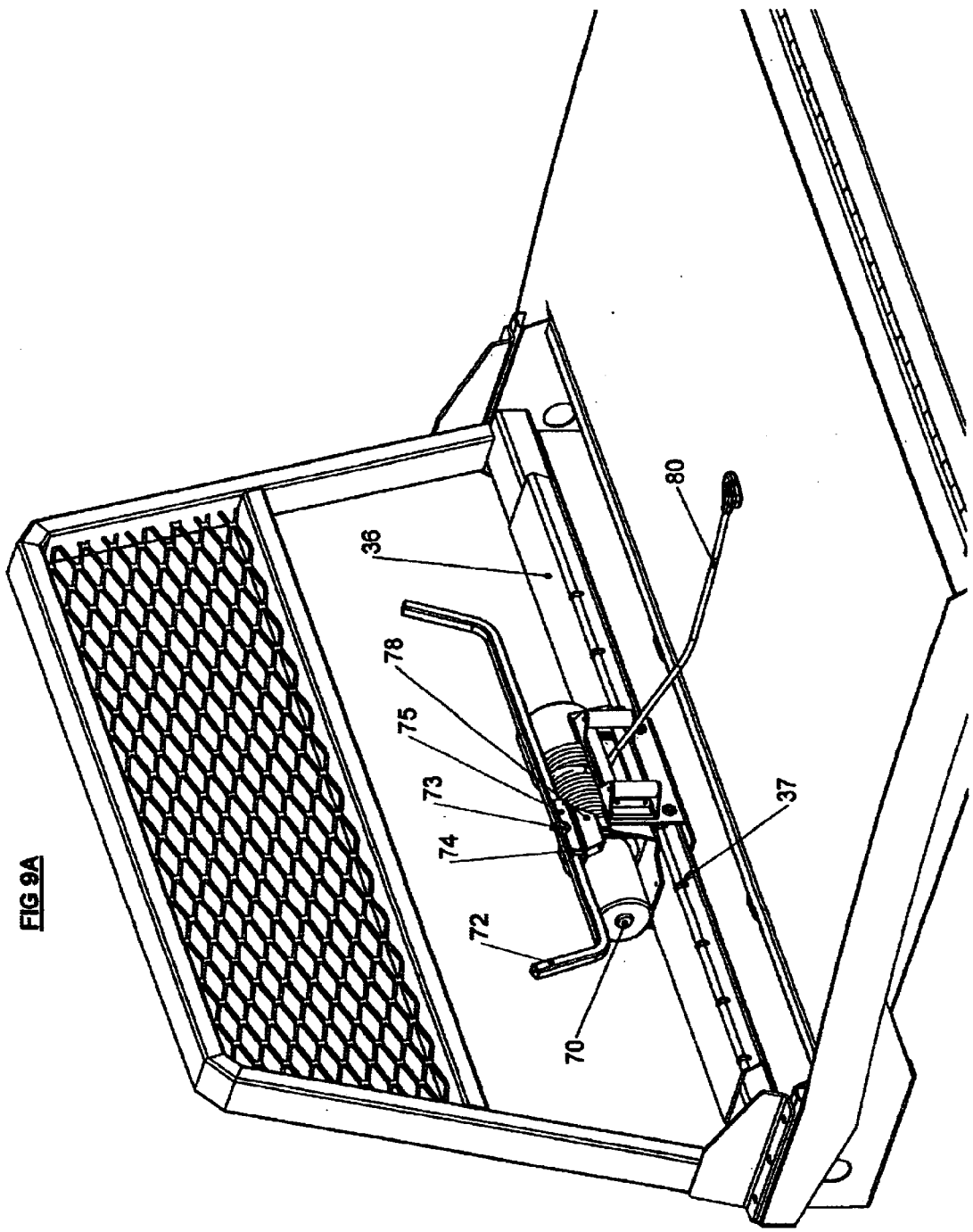

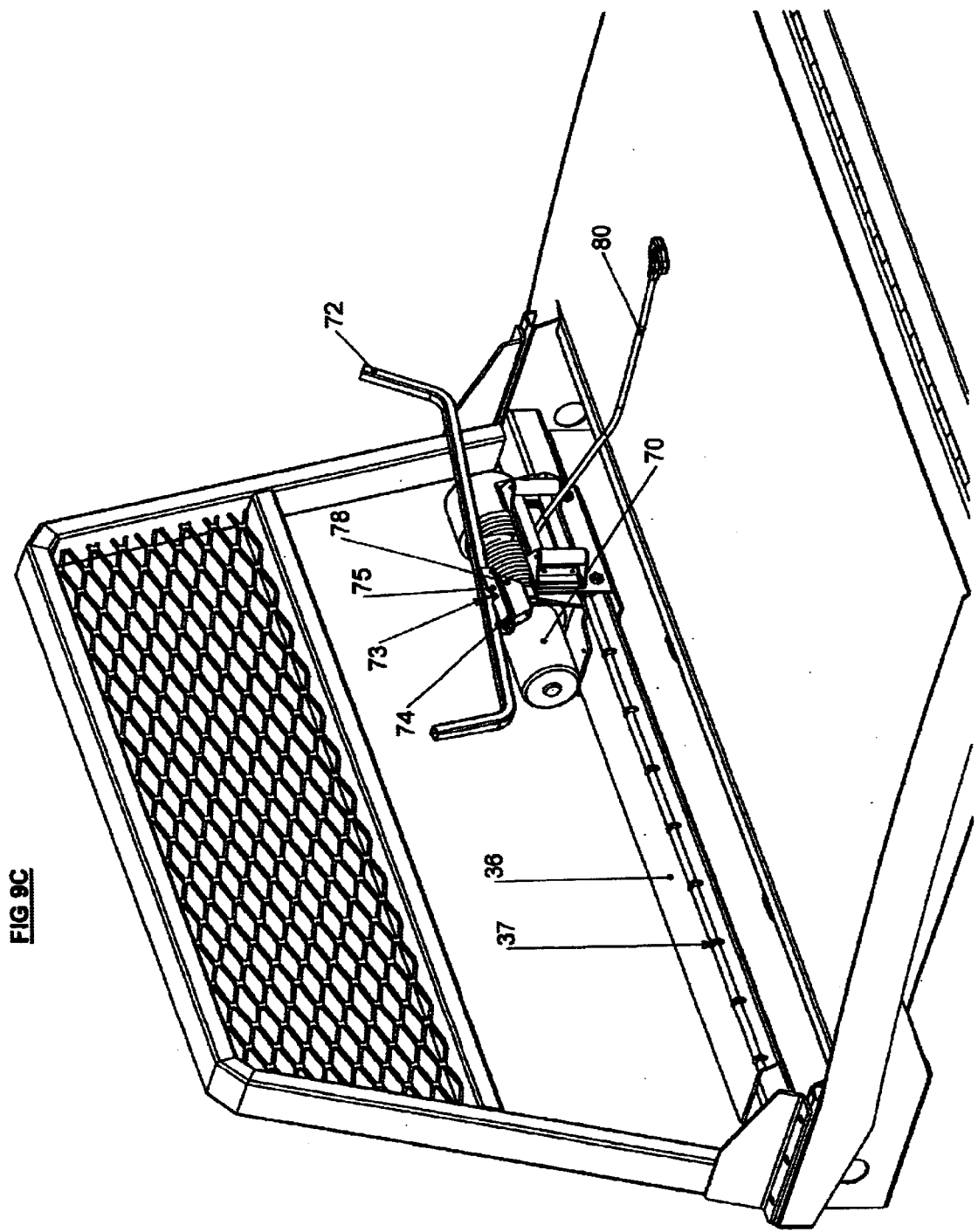

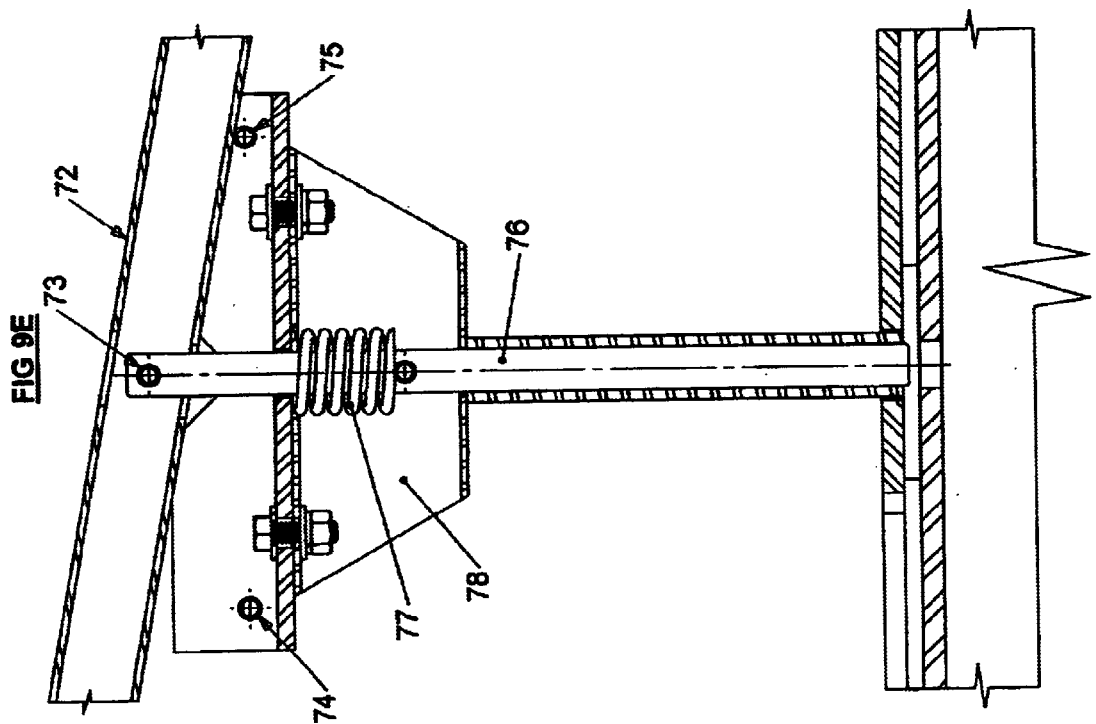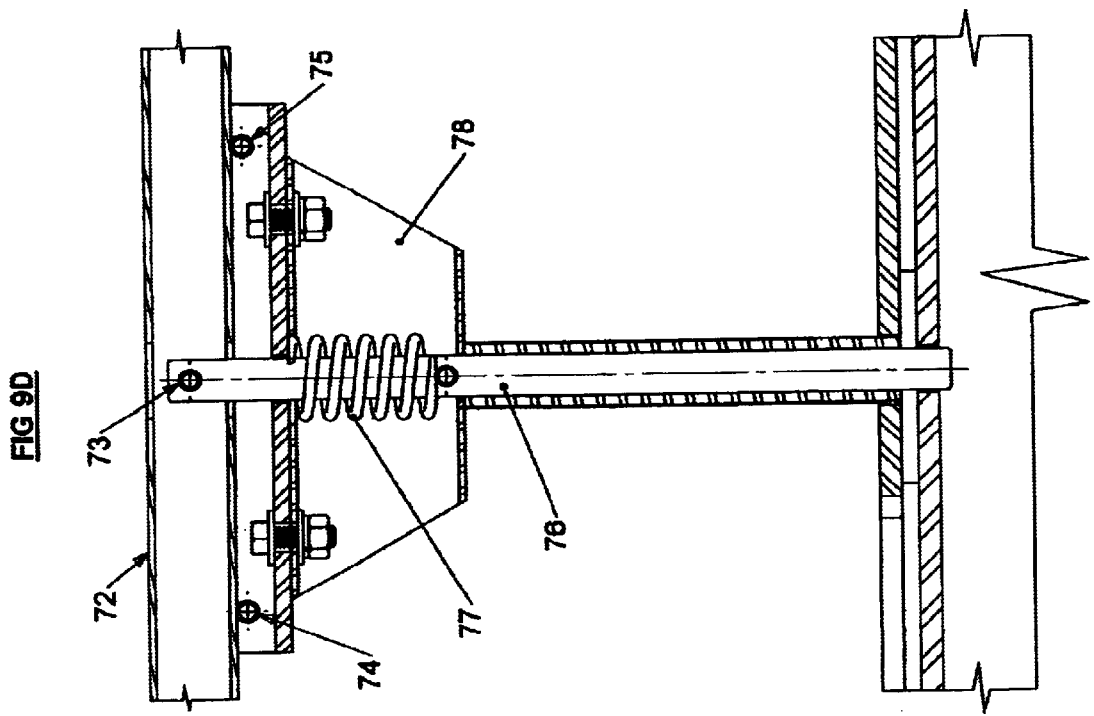

TRUCK BED DESIGN FOR AUTOMOTIVE AND EQUIPMENT DELIVERY

This application claims the benefit of Provisional Application No. 60/192,961, filed Mar. 29, 2000.

BACKGROUND OF THE INVENTION

The present invention relates to truck beds for automobile and equipment delivery, and more specifically to a truck bed which is divided into two areas and connected by a hinge.

Distributors of construction related rental equipment are daily confronted with the task of reducing the cost of single unit equipment delivery to the end user. Many are forced to use large tractors and trailers or heavy duty trucks equipped with roll back beds, which have been purchased to haul the bulkiest equipment in their rental fleets, for delivery of very small units. This has made the single delivery of a small unit very costly to the distributor since he cannot pass on the full expense to his customer. To reduce costs, the distributor will sometimes load a large trailer with a number of pieces of equipment, each destined for delivery to a different site. By following this practice, only one customer will receive his order in a timely fashion. The rest will have to wait.

An alternative method requires that the distributor own one or several small trailers towed by heavy duty pick-up trucks to make these deliveries. Even a small truck-trailer combination is quite long and difficult to maneuver for all but a skilled operator, especially in crowded city traffic. Delivery on muddy construction sites with such truck-trailer combinations is extremely difficult, especially when backing up to a drop off site is required.

The present invention is intended to overcome these shortcomings.

SUMMARY OF THE INVENTION

The present invention is directed to a specialized truck bed wherein the bed is divided into two areas or decks connected by a transverse hinge.

In one embodiment of the present invention, each deck section of the bed is constructed in an arch. The result is a light weight bed of great strength without need for a number of heavy gauge cross pieces as is typical in conventional flat bed design. An additional benefit of this design is that the resultant lowered center of gravity of both the bed and the load provides improved handling and a sense of greater stability for the driver.

In another embodiment, when in the travel position, the arch of the rear deck is slightly higher than that of the front. The benefit of this feature is that no significant hump occurs at the hinge line when the rear deck is lowered for ground loading and unloading. This allows very easy loading of any equipment with low ground clearance without fear of bottoming out on the hinge when crossing from the rear to the front portion of the deck.

In another embodiment, the rear deck-ramp combination of the present invention creates a very gentle grade, low enough to allow most powered equipment to readily climb onto the deck without assistance from a winch, thus reducing the cost of loading by saving time and labor.

In still yet another embodiment, the front deck portion is firmly fixed to the truck frame with conventional "U" bolts and shear plates. In the travel position, the hinge mounted rear deck is carried on two posts whose top ends are mounted to the deck frame while the slotted bottom end rests in truck frame mounted pins. The rear deck can be moved through an arc by a frame mounted elevating device such as an air or hydraulic cylinder, or by a powered screw. Ideally, the elevating device does not carry any load while the bed is in the travel position. This movement allows the rear deck to be raised for loading and unloading to an elevated dock, or lowered for loading and unloading directly to the ground. The rear deck also has a storage apparatus for ramps. These are used as a length addition to the lowered rear deck for ground loading and unloading. The rear deck-ramp combination creates a very gentle grade, low enough to allow most powered equipment to readily climb onto the deck without assistance from a winch, thus saving labor and time in loading the truck bed.

In a further embodiment, the truck bed has a winch which can be fitted to a cross tube assembly at the front of the deck. This tube assembly has a number of equally spaced slots along its front edge to engage a shot pin on the winch carrier for locking the winch against sideways movement when it is being used to assist in loading. This locking feature is especially beneficial when loading narrow equipment where two or more can be loaded side by side. In those cases, the movable winch can be positioned so that its cable will pull each piece of equipment onto the deck in a straight line. The present invention also encompasses this winch in other types of truck beds.

In still a further embodiment, the bed is fitted with numerous chain hold down points across the front and back, and along both sides.

BRIEF DESCRIPTION OF THE DRAWINGS

In describing the preferred embodiments, reference is made to the accompanying drawings wherein:

FIG. 3B shows the access door of the rear bed portion of the truck bed closed and securely locking the hook end of the ramp against removal or disengagement during loading.

FIG. 4 shows the ramps positioned laterally from a central storage position and being securely locked and ready for loading.

FIG. 6B shows a higher perspective view of the truck bed at FIG. 6A.

FIG. 7 shows the rear portion of the truck bed in its travel position supported on a two-post assembly.

FIG. 7B shows an oblique view of the truck bed in its travel position supported on the two-post assembly.

FIGS. 8A–8D show in detail each of the elements of the two-post assembly and an elevating mechanism of an embodiment of the present invention in a step by step sequence.

FIG. 9A shows a winch carrier and winch of an embodiment of the present invention in the middle of the truck bed.

FIG. 9C shows the winch carrier and winch on the right side of the truck bed.

FIG. 9D shows a cross section of the winch carrier in the locked position.

FIG. 9E shows a cross section of the winch carrier in the unlocked position.

DETAILED DESCRIPTION OF THE PRESENTLY PREFERRED EMBODIMENTS

Figure 1:
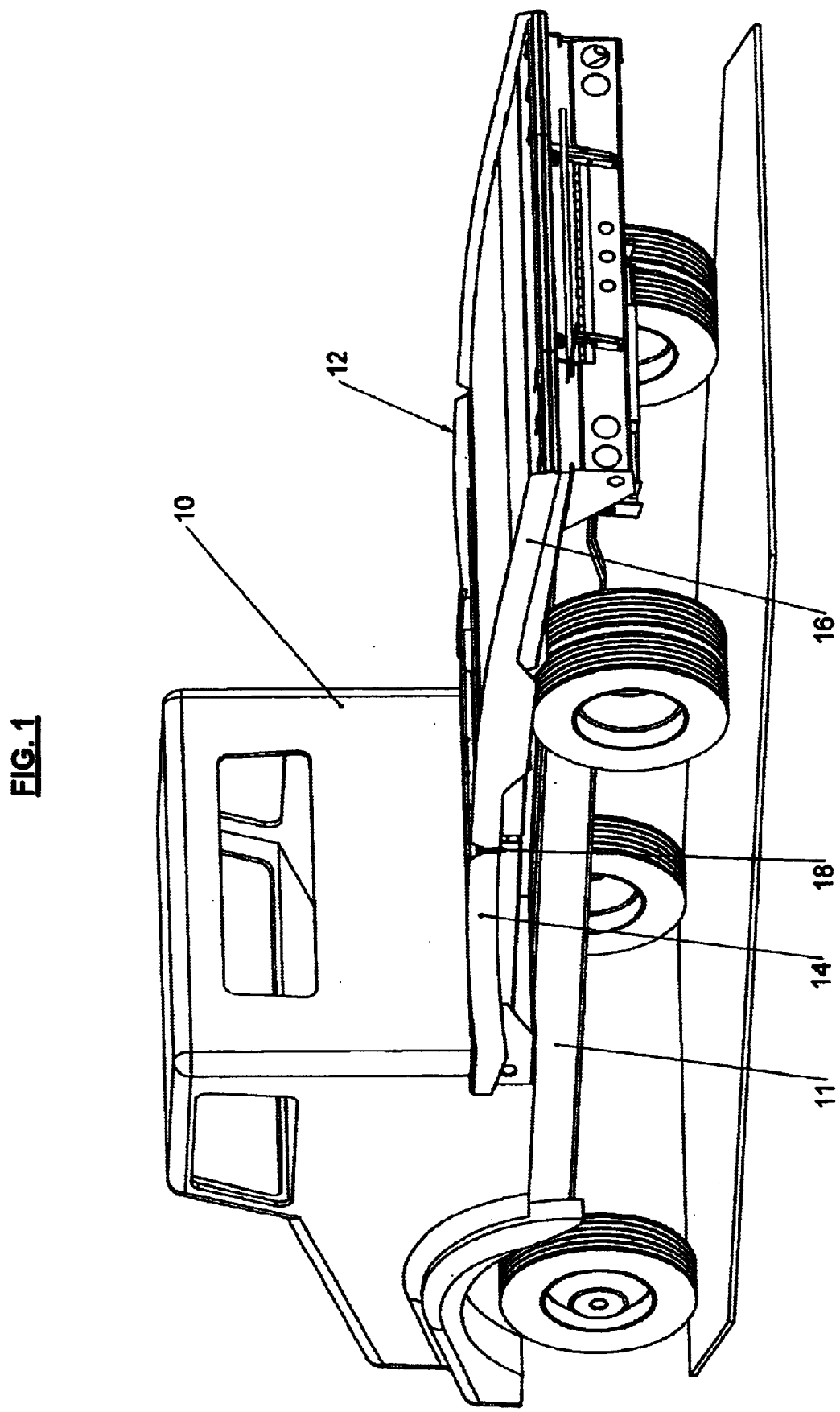
FIG. 1 shows an unloaded truck with the truck bed of the present invention in a travel position.

In the accompanying drawings, FIG. 1 shows an unloaded truck 10 with a truck frame 11 and a truck bed 12 of the present invention in a travel position. The truck bed 12 has a front deck portion 14 and a rear deck portion 16. In a preferred embodiment, the front deck portion 14 and the rear deck portion 16 are each constructed in the form of an arch, as shown in FIGS. 1, 2, 4, 5, 6 and 7. In a further preferred embodiment, when in the travel position, the arch of the rear deck portion 16 is slightly higher than that of the front bed portion 14. A transverse hinge 18 preferably connects the front deck portion 14 and the rear bed portion 16.

Preferably, the front deck portion 14 is firmly fixed to the truck frame 11. This connection can be made with, but is not limited to, "U" bolts and shear plates. In the travel position, the hinge mounted rear deck 16 is preferably carried on a two-post assembly 40 whose top ends are pinned to cross beam assembly 41 at 42. The closed latch 44 of the two-post assembly 40 rest on pin 64 in a frame mounted cross beam 60 shown in FIG. 7 and detailed in FIGS. 7A–7D and 8A–8D.

Figure 6A:
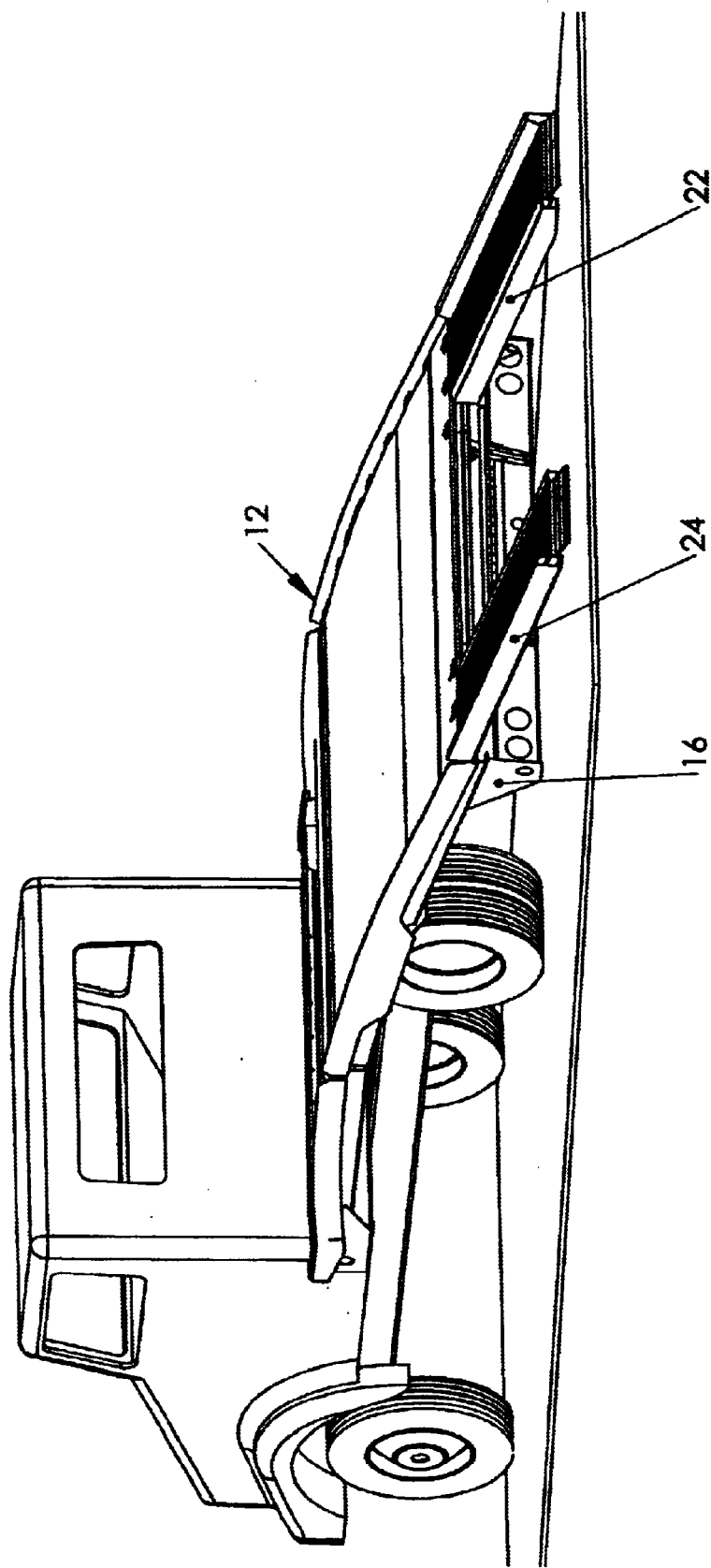
FIG. 6A shows the rear portion of the truck bed further lowered around its central hinge to a preferred loading position.

As shown in FIGS. 6A and 6B, the rear deck 16 can be moved through an arc about transverse hinge 18 by a frame mounted elevating device, such as, for example but not limited to, an air bag 62 or a hydraulic cylinder or powered screw. Preferably, the elevating device will not carry a load while the bed 12 is in the travel position. This is accomplished by carrying the load on the two-post assembly 40. The arc movement allows the rear portion 16 of the bed 12 to be either (1) raised for loading and unloading to an elevated dock, or (2) lowered for loading and unloading directly to the ground as shown in FIGS. 6A and 6B.

The bed is fitted with numerous chain hold-down points across the front and back, and along both sides. An optional winch (as shown in FIGS. 9A–9E) can be fitted to the cross tube assembly (shown in FIG. 6B) at the front of the deck to assist the loading of equipment which is either unpowered or without sufficient power to climb the ramps. Preferably, the tube assembly has a number of equally spaced slots 37 along its front edge to engage a shot pin on the winch carrier for locking the winch against sideways movement when it is being used to assist in loading. This locking feature is useful when loading narrow equipment so that two or more can be loaded side by side. In those cases, the movable winch can be positioned so that it can pull each piece of equipment in a straight line. The winch can also be used with standard truck beds or in other vehicles.

Figure 2:
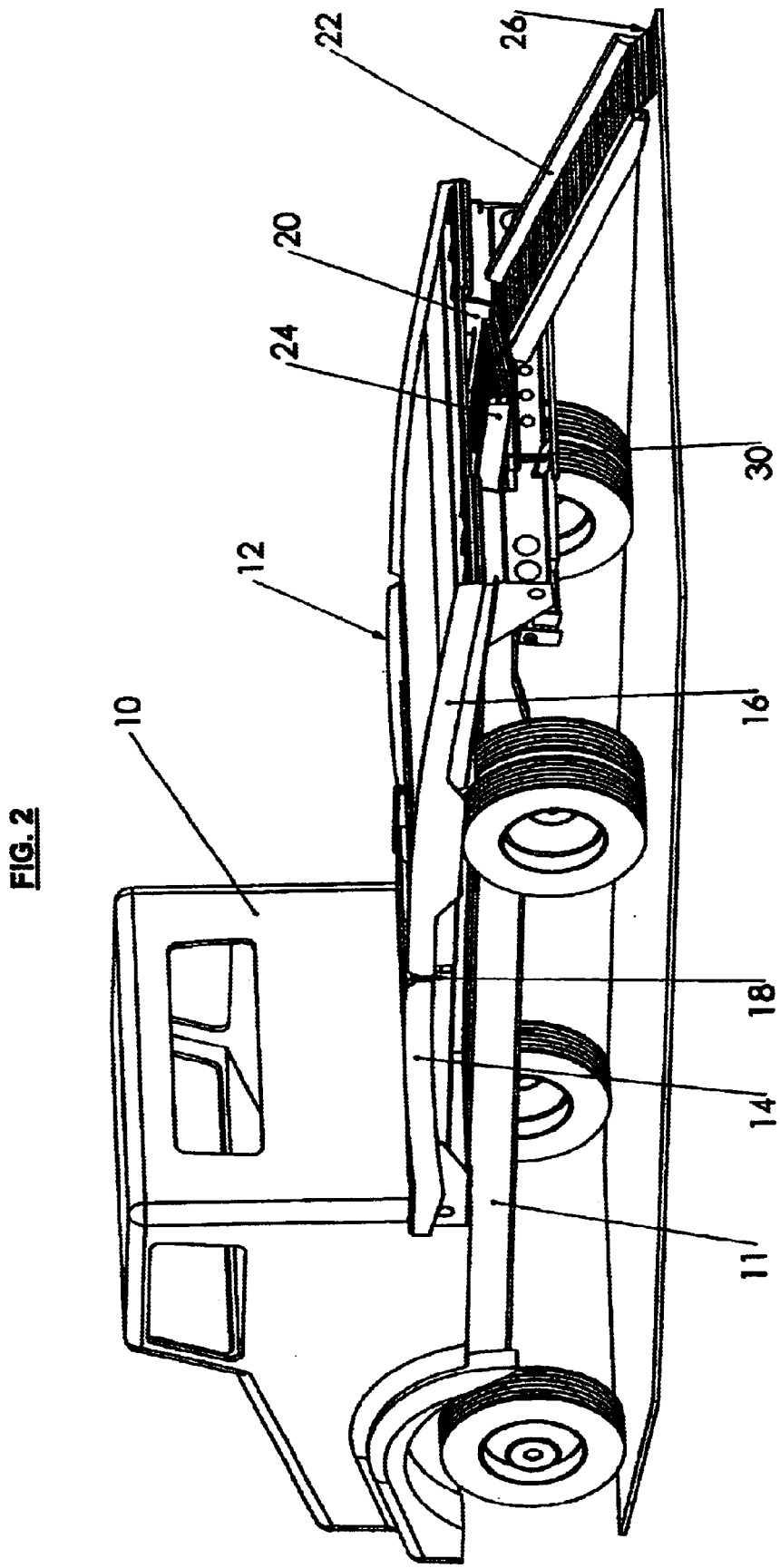
FIG. 2 shows ramps lowered to the ground from the storage area in the rear bed portion of the truck bed of the present invention.

In another embodiment of the present invention, the rear deck 16 has a storage area 20 for storing or holding ramps. These ramps are used as a length addition to the lowered bed for ground loading and unloading. FIG. 2 shows a ramp access door 30 open with one ramp 22 out and lowered to the ground, and another ramp 24 partially removed. The ramps 22 and 24 and the deck 16 are joined when the ramp access door 30 is closed so that the ramps are locked against accidental removal, yet are free to be adjusted sideways to accommodate varying wheel widths (see FIGS. 4, 5, 6A and 6B).

Figure 3A:
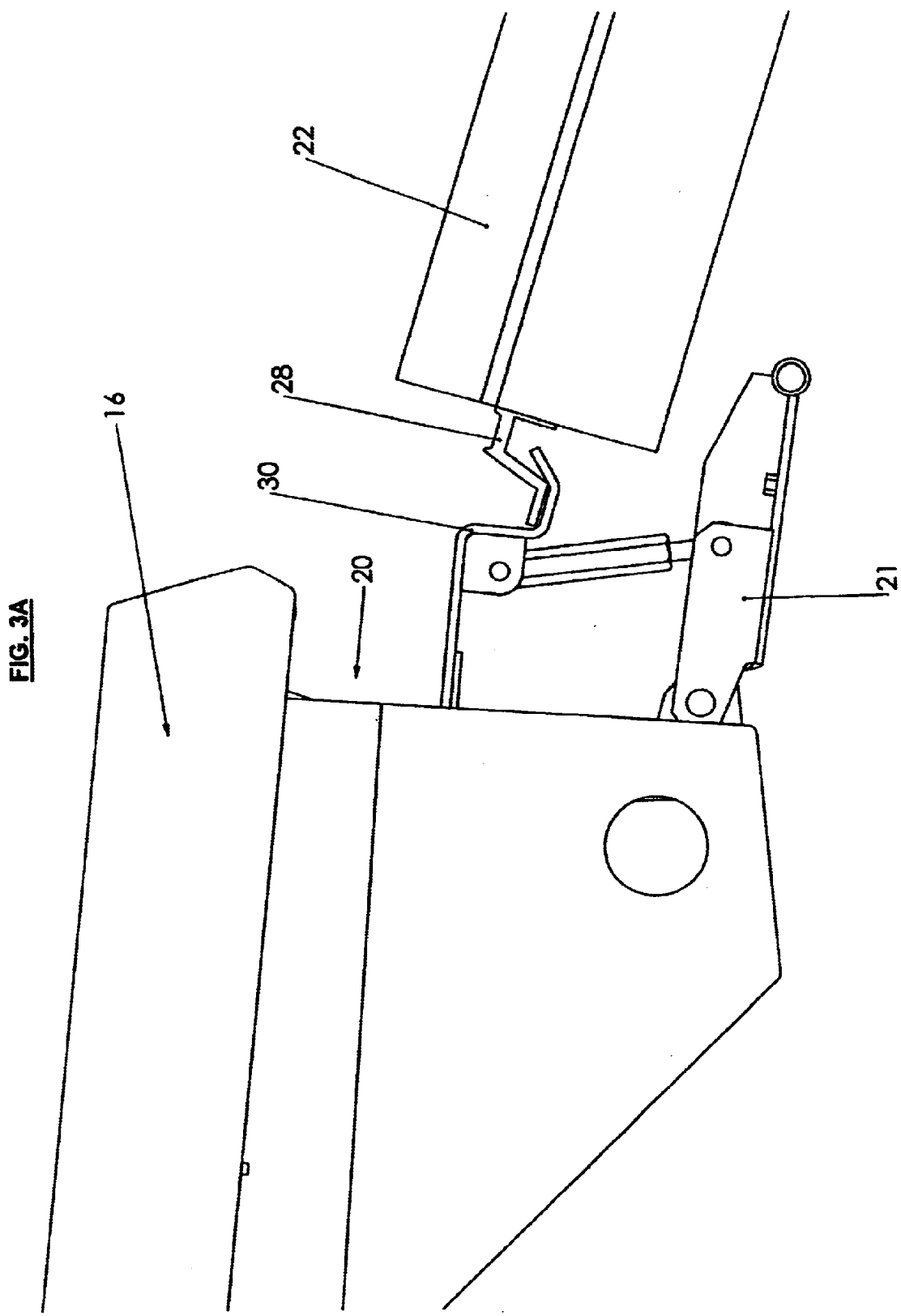
FIG. 3A shows the lip of the door to the storage area of the rear bed portion of the truck bed supporting a hook end of a ramp.

In another embodiment, the free end 26 of the ramp 22 can be grasped and pulled completely from the storage area 20 until the upper hooked end 28 of the ramp stops automatically against an upturned lip of access door 30, as shown in FIG. 3A. The free end is then lowered to the ground. When the ramps have been extracted, the access door 30 is closed by the latching mechanism 21. This effectively locks the ramps to the rear of the truck bed preventing accidental removal, yet allows them to be freely positioned laterally to accommodate varying wheel widths of the equipment that will be loaded. Preferably, the ramps are removed from their storage area 20 prior to fully lowering the rear deck 16 to the desired loading position as shown in FIGS. 6A and 6B. This is advantageous so as to provide room for the rear end of the truck frame 11, which will occupy part of the ramp storage area 20.

Figure 5:
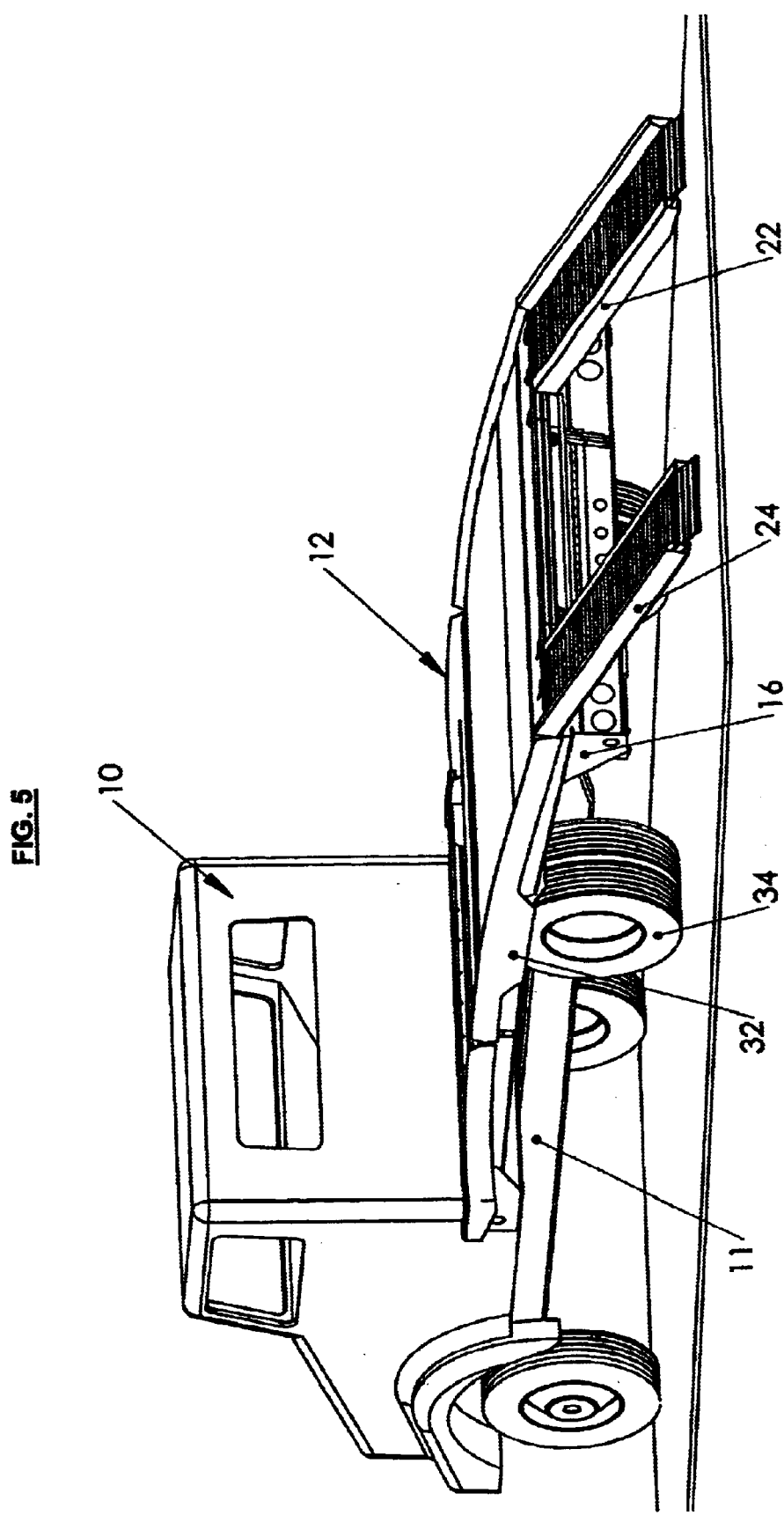
FIG. 5 shows the truck bed and ramp combination of the present invention with the truck bed partially lowered where, for example, it is mounted to a truck with a voided air suspension.

In another preferred embodiment of the present invention, the truck bed 12 is mounted on a truck 10 equipped with a rear axle air suspension. FIG. 5 shows the truck bed-ramp 32 combination in a partially lowered position wherein the air bags of the suspension have been vented, thus lowering the frame 11 at the rear axle approximately 4 to 5 inches.

FIG. 6A shows an embodiment of the truck bed 12-ramp 22 combination in a position to load equipment. In this drawing, the rear deck 16 has been lowered to a solid stop when the preferred air bag 62 of the frame mounted elevating apparatus has been vented. FIG. 6B shows the same view as FIG. 6A, but from a slightly higher perspective so that the transverse hinge 18 across the center of the bed 12 and the notched front cross tube 36 and the notches 37 are clearly shown.

In another embodiment of the present invention, the rear portion of the truck bed 16 is held in the travel position by a two-post assembly 40 whose top ends are pinned to the deck cross beam 41 at 42, while the closed latch 44 rest on pin 64 in a truck frame cross beam 60.

Figure 7A:
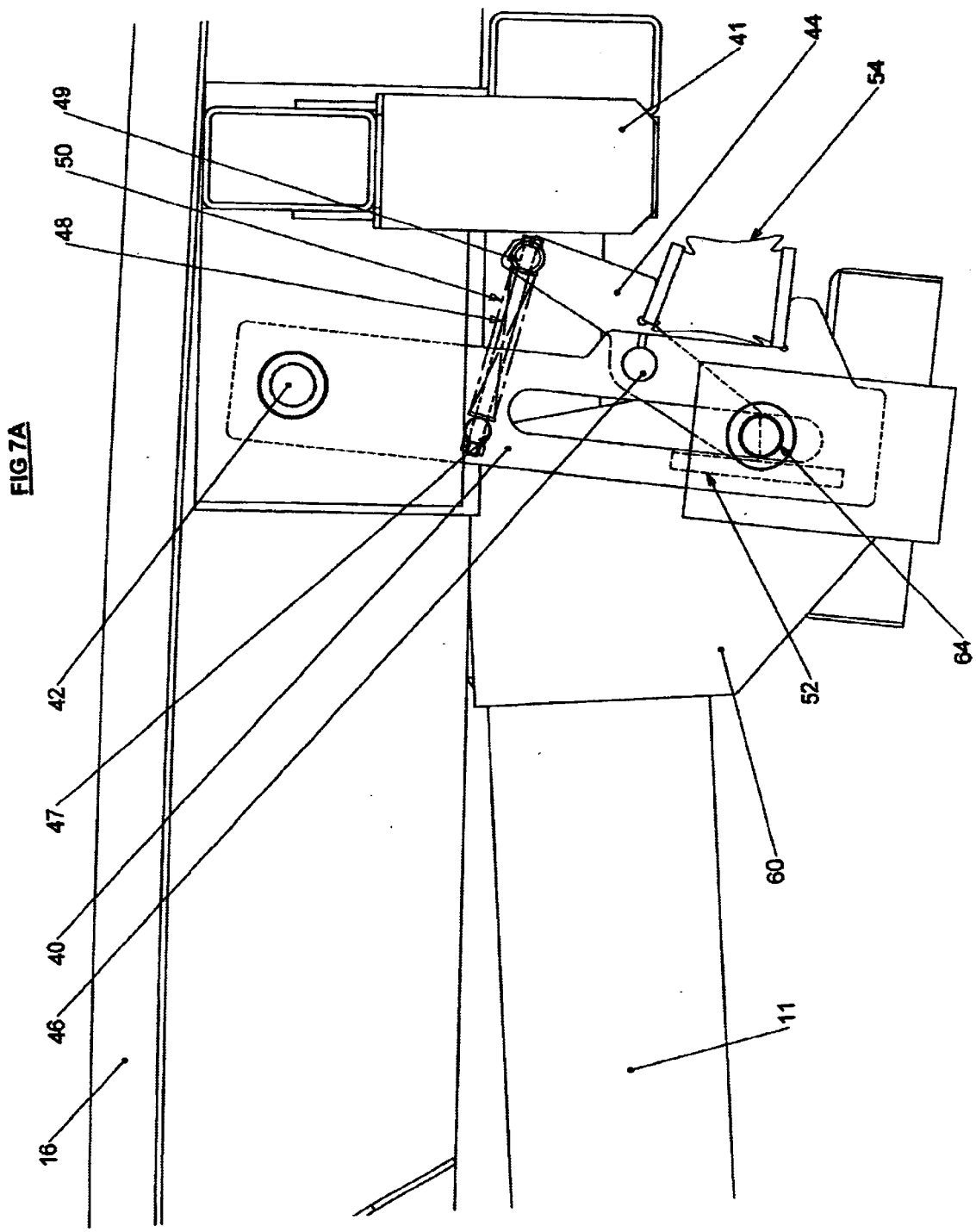
FIG. 7A shows the post assembly of FIG. 7 in greater detail.
Figure 7C:
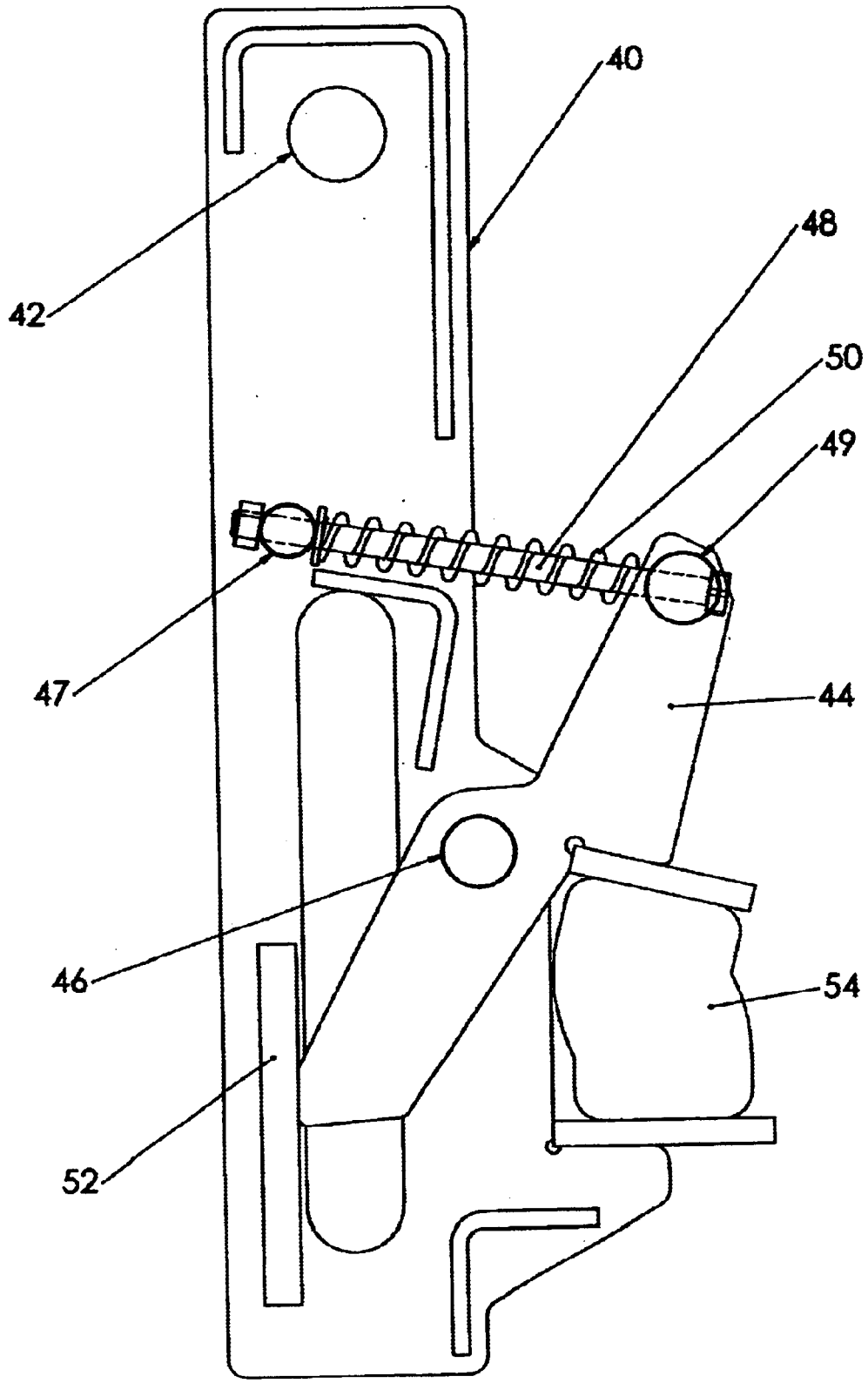
FIGS. 7C and 7D shows the latch of the post assembly in the closed and open positions.
Figure 7D:
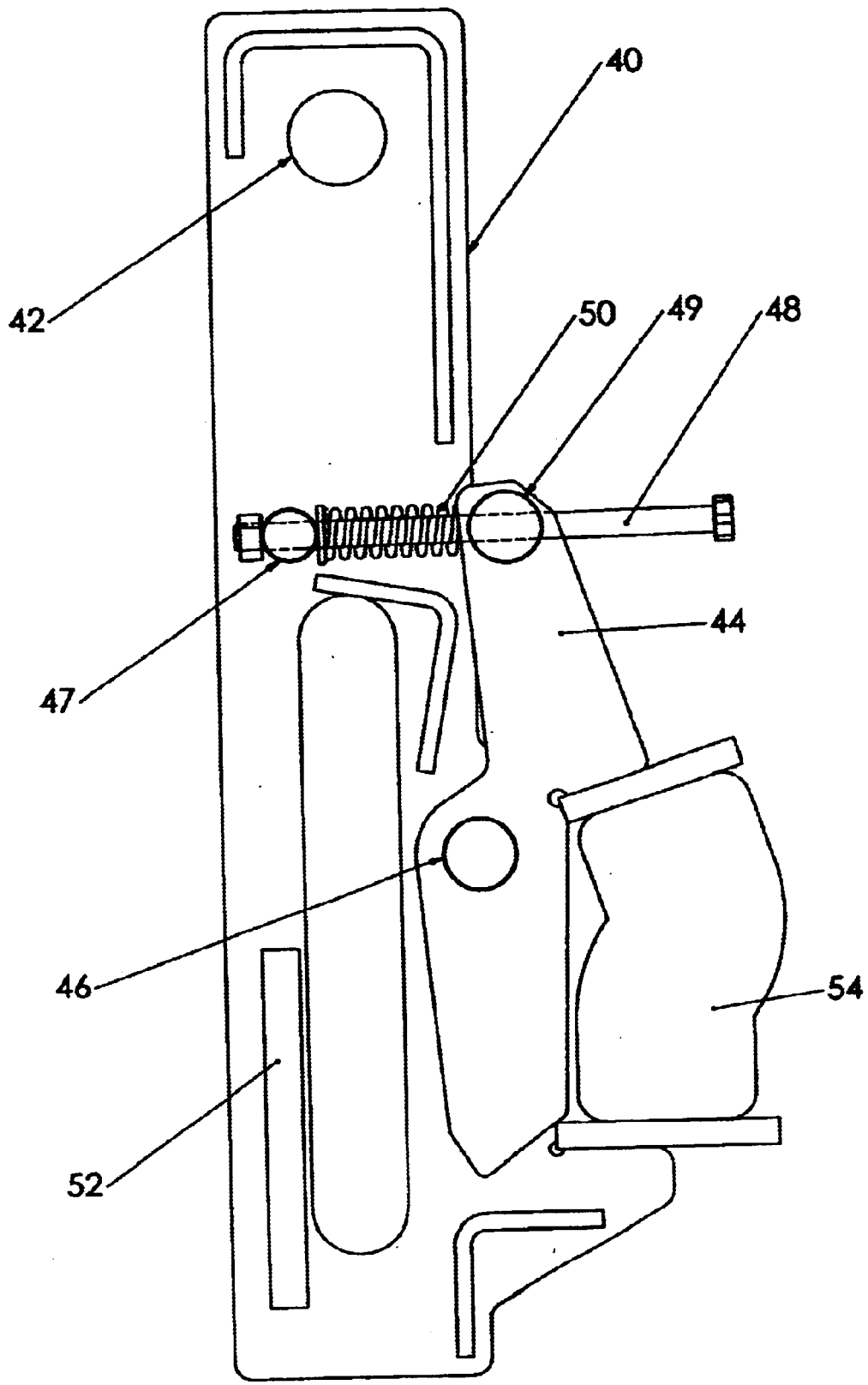

Referring to FIGS. 7A, 7C and 7D, the elements of the post assembly 40 of an embodiment of the present invention are described in detail. The latch assembly 44 is pivotally mounted to post weldment by pin 46. When its operating airbag 54 is vented, it is biased to the closed position (see FIG. 7C) by spring 50 moving on rod 48 which is threaded to pin 47 and is freely axially movable through pin 49. Rotational movement of the latch 44 is stopped when its tip abuts plate 52. When the airbag 54 is inflated, the latch 44 opens by rotating around pin 46 while compressing spring 50 on rod 48 (see FIG. 7D).

Figure 8A:
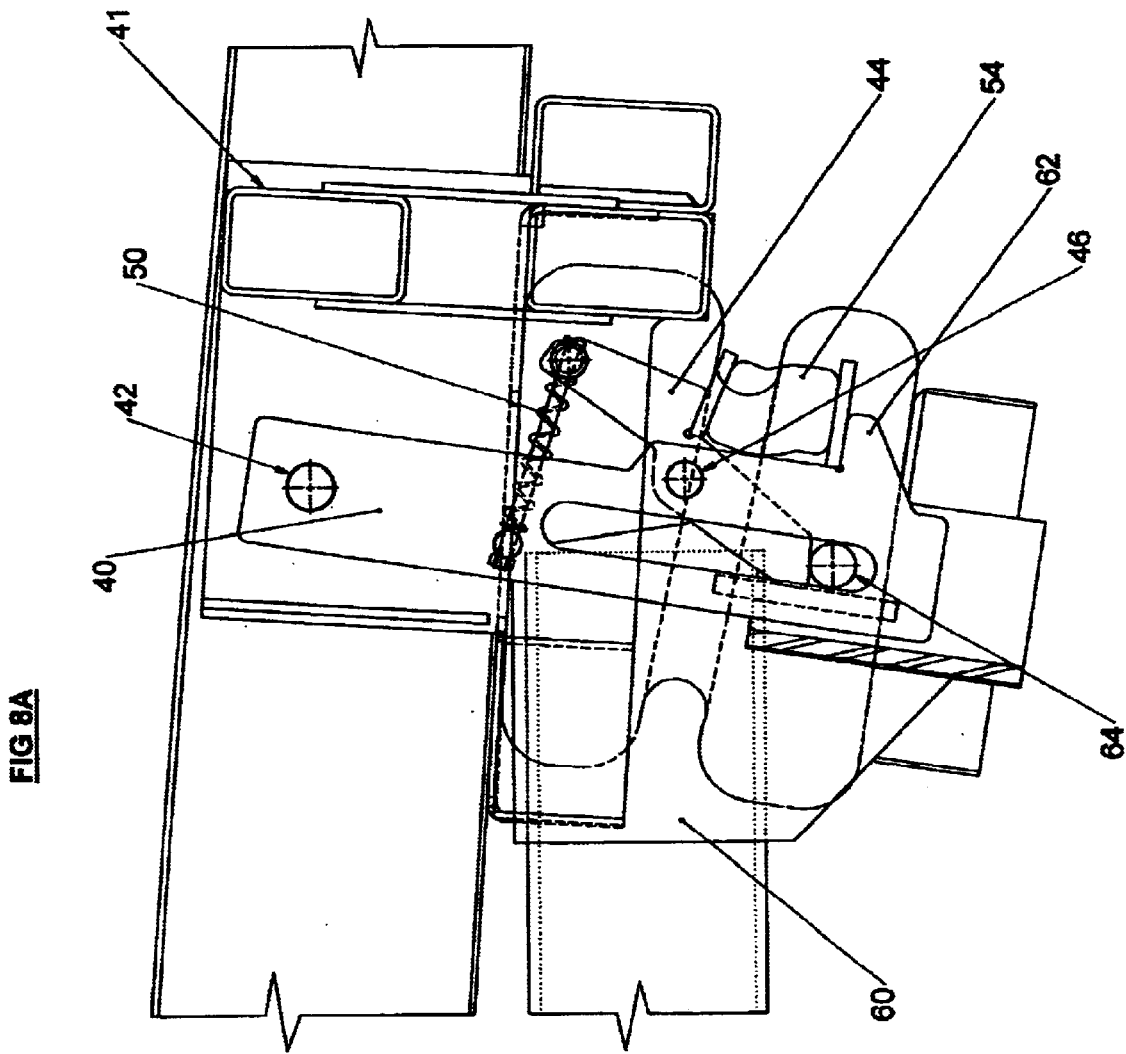
Figure 8C:
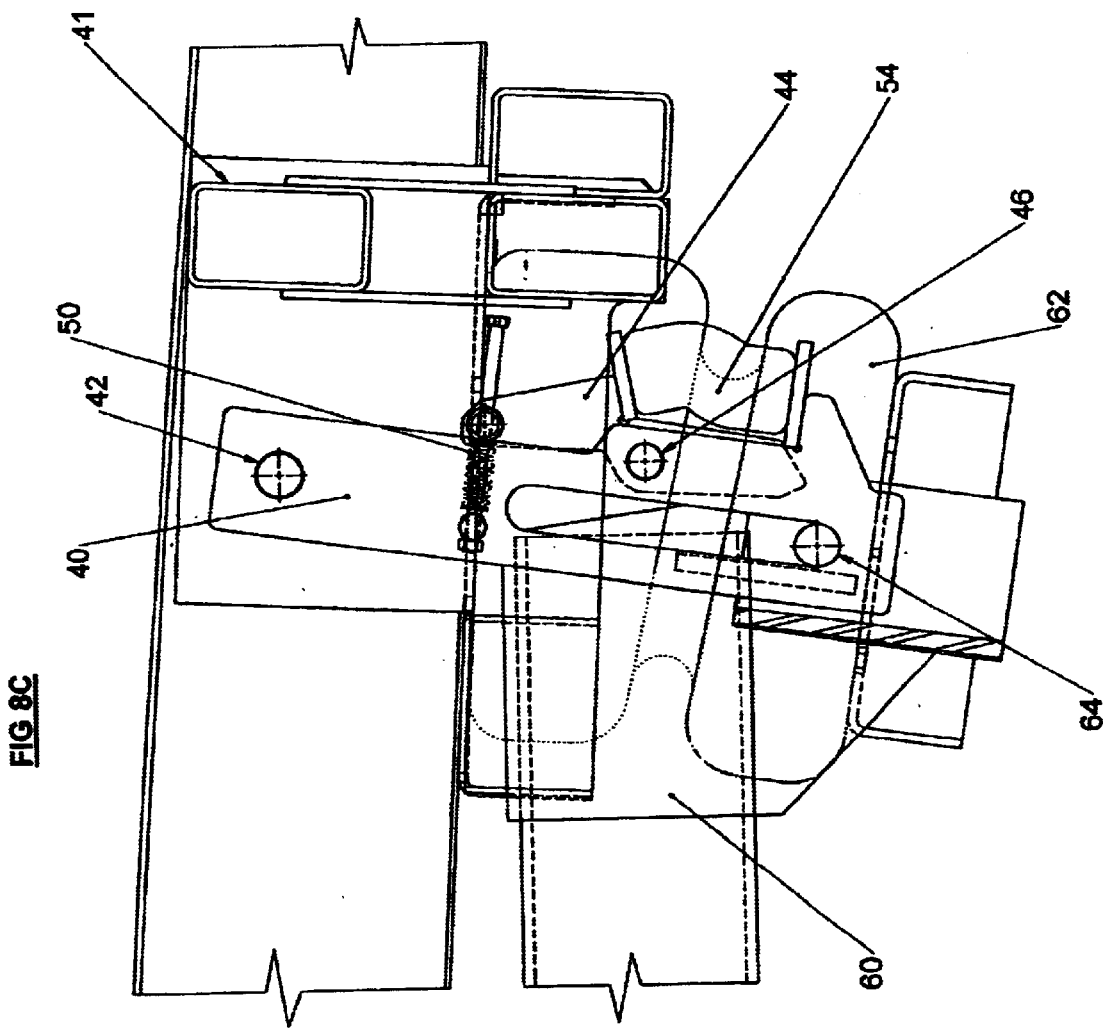
Figure 8D:
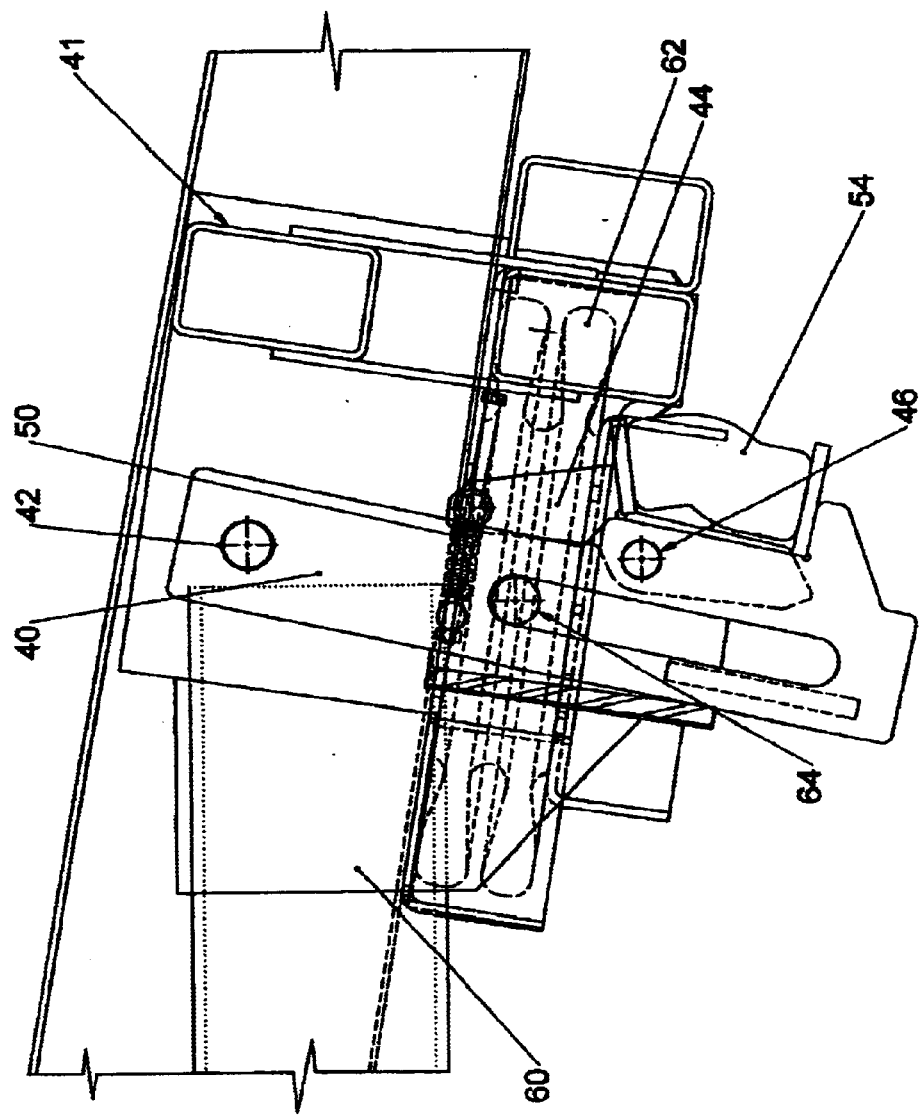

FIGS. 8A through 8D are side views of the two-post assembly 40 together with the truck bed cross frame 41, the truck frame cross beam 60, and the preferred air bag elevating actuator 62. In FIG. 8A, the two-post assembly 40 is shown in the travel position with the bottom face of the latch 44 resting on frame pin 64, and with airbags 54 and 62 vented. In FIG. 8B, airbag 62 is partially inflated thus lifting the deck and the post assemblies 40 so that the bottom face of the latch 44 no longer rests on frame pin 64. In FIG. 8C, airbag 54 has been pressurized causing latch 44 to pivot on pin 46 so that its tip is rotated away from the slot in post assembly 40. In FIG. 8D, airbag 54 remains pressurized while airbag 62 is venting, allowing the rear deck 16 to lower fully. At this point, airbag 54 may be vented allowing latch 44 to close. When elevating the rear deck 16 by pressurizing airbag 62, the post assembly 40 moves upward. When the top face of the latch 44 strikes the bottom side of the frame pin 64, the latch will rotate toward its open position while staying biased against pin 64 due to the compression of spring 50. When the deck has been elevated high enough so that the bottom tip of the latch 44 has cleared the top of pin 64, it will automatically spring shut. At this point, airbag 62 is vented, thus lowering the deck to its traveling position.

A further embodiment of the present invention is directed to a winch system with a winch 70 as shown in FIG. 9A. Such a winch system can be used with the truck bed of the present invention or on other types of vehicles and truck beds and is not limited to the location shown in the figure. In FIG. 9A, the winch system is shown with the winch in a locked position in the center of the bed ready to deploy the winch cable 80 for pulling equipment up the ramps 22, 24 onto the truck bed 12 when the rear deck portion 16 has been lowered and the ramps have been deployed. Handle 72 is shown in horizontal position. As a result, the locking pin 76 (see FIGS. 9D and 9E), which is pivotally attached to handle 72 by cross point 73, is biased down into one of the notches 37 by an internal spring 77 positioned inside tube 78. This biasing action also pulls handle 72 firmly against pins 74 and 75.

Figure 9B:
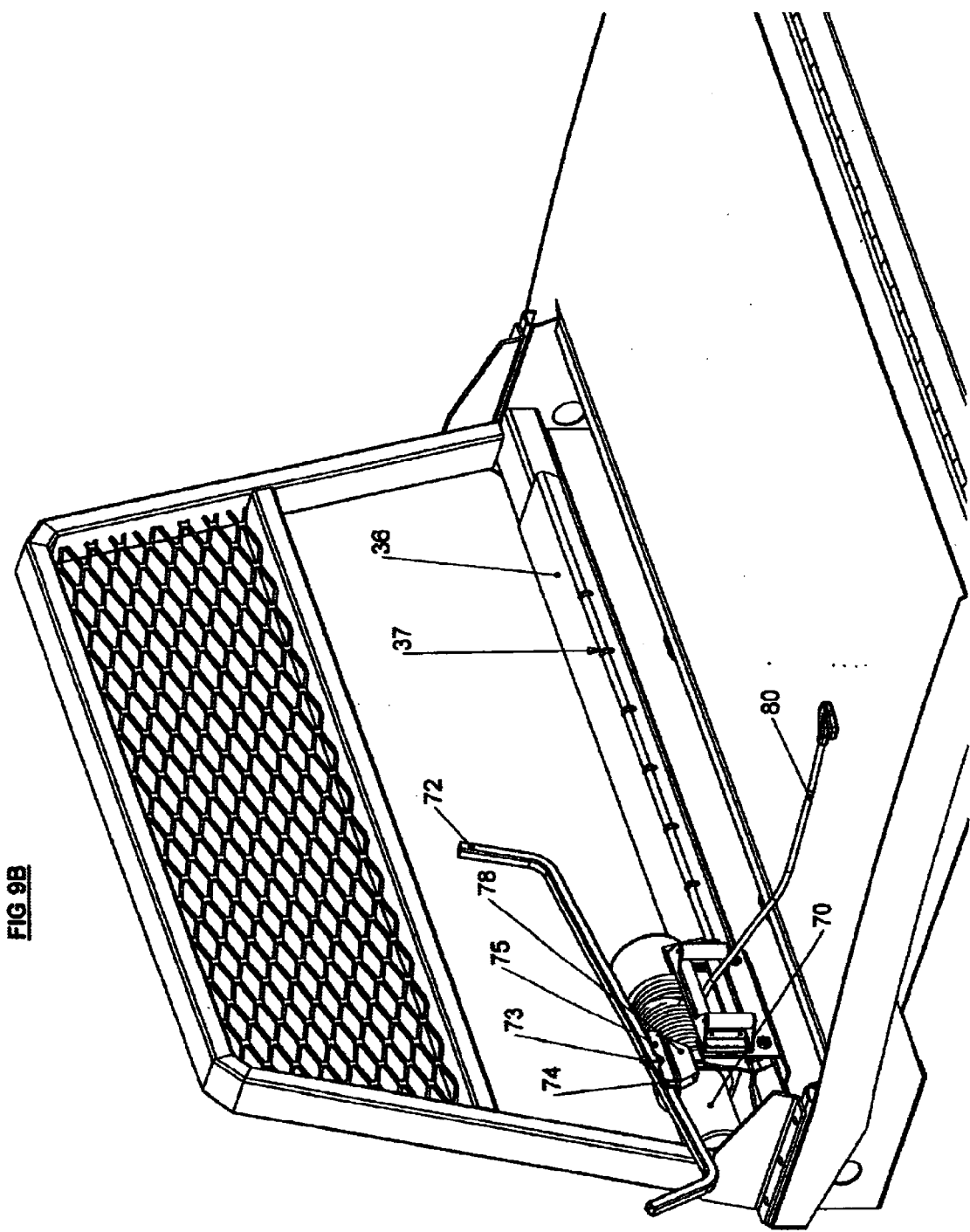
FIG. 9B shows the winch carrier and winch on the left side of the truck bed.

FIG. 9B shows another embodiment of the winch system and winch 70 positioned along the front winch carrier tube 36 to the left of center, and locked in any of the notches 37 to prevent sideways movement while loading equipment. In practice, the handle 72 can be grasped and pulled down so that it rotates around pin 74 thus pulling the locking pin 76 from notch 37 freeing the winch carrier for movement to the left.

FIG. 9C shows another embodiment of the winch system wherein the winch is positioned to the right of center.

FIGS. 9D and 9E show the relationship of the details of the handle 72, cross pin 73, pins 74 and 75, locking pin 76, spring 77, and tube 78.

This description has been offered for illustrative purposes only and is not intended to limit the invention of this application which is defined in the claims below.

I claim:

1. A truck comprising:
    a frame; and
    a bed located on said frame, said bed comprising:
        a front bed portion;
        a rear bed portion; and
        a hinge connecting said front bed portion and said rear bed portion,
        wherein each of said front bed portion and said rear bed portion arches upward toward said hinge, so that said bed has a continuous convex curve shape over said frame.

2. The truck bed of claim 1 wherein said rear bed portion is higher than said front bed portion when the truck bed is in a traveling position.

3. The truck bed of claim 1 wherein said rear bed portion includes a storage mechanism for storing at least one ramp.

4. The truck bed of claim 3 wherein said storage mechanism includes a ramp access door which opens for removal of said ramp, has an upturned lip to act as a stop when lowering said ramp and once said ramp is lowered, said door is closed to lock the ramp to the rear bed portion of the truck bed.

5. The truck bed of claim 1 wherein said front bed portion is firmly fixed to a frame on said truck.

6. The truck bed of claim 1 wherein said front bed portion includes a winch.

7. The truck bed of claim 6 wherein said winch is fitted to a cross tube assembly on said front bed portion.

8. The truck bed of claim 7 wherein said cross tube assembly has a plurality of spaced slots for moving and locking the winch at different positions along the cross tube assembly.

9. The truck bed of claim 1 wherein said rear bed portion is located on a frame mounted elevating device for raising and lowering the rear bed portion in an arc type motion.

10. The truck bed of claim 9 wherein said frame mounted elevating device is an air bag.

11. The truck bed of claim 1 wherein said rear bed portion is located on a two-post assembly which is pinned to the underneath of the rear bed portion and includes a first airbag,
    wherein said rear bed portion is lowered when said first airbag is initially slightly inflated and then vented and
    wherein said rear bed portion is raised when said first air bag is inflated.

12. The truck bed of claim 11 wherein each said post assembly includes a latch assembly pivotally mounted to said post assembly and coupled to a spring and in contact with a second airbag,
    wherein when said rear bed portion is raised, said second air bag is inflated and said spring constricted, causing said latch assembly to rotate upward and towards said post assembly, and
    wherein after said rear bed portion is lowered, said second airbag is vented and said spring expands causing said latch assembly to rotate downward and away from said post assembly.

13. The truck bed of claim 12 wherein said post assembly further includes a plate to stop downward rotation of said latch assembly.

14. The truck bed of claim 1 wherein said hinge is a transverse hinge and said rear bed portion is able to be lowered to the ground without lowering said front bed portion.

15. The truck bed of claim 1 wherein said front bed portion is stationary and said rear bed portion can be lowered to the ground.

16. The truck bed of claim 15 wherein said rear bed portion is higher than said front bed portion when the truck bed is in a traveling position.

17. The truck bed of claim 15 wherein said rear bed portion includes a storage mechanism for storing at least one ramp.

18. The truck bed of claim 15 wherein said front bed portion is firmly fixed to a frame on said truck.

19. The truck bed of claim 15 wherein said front bed portion includes a winch which is fitted to a cross tube assembly on said front bed portion.

20. The truck bed of claim 19 wherein said cross tube assembly has a plurality of spaced slots for moving and locking the winch at different positions along the cross tube assembly.

21. The truck bed of claim 15 wherein said rear bed portion is located on a frame mounted elevating device for raising and lowering the rear bed portion in said arc type motion.

22. The truck bed of claim 21 wherein said frame mounted elevating device is an air bag.

23. The truck bed of claim 21 wherein said rear bed portion is located on a two-post assembly which is pinned to the underneath of the rear bed portion and includes a first airbag, wherein said rear bed portion is lowered when said first airbag is initially slightly inflated and then vented and wherein said rear bed portion is raised when said first air bag is inflated.

24. The truck bed of claim 23 wherein each said post assembly includes a latch assembly pivotally mounted to said post assembly and coupled to a spring and in contact with a second airbag, wherein when said rear bed portion is raised, said second air bag is inflated and said spring constricted, causing said latch assembly to rotate upward and towards said post assembly, and wherein after said rear bed portion is lowered, said second airbag is vented and said spring expands, causing said latch assembly to rotate downward and away from said post assembly.

25. The truck bed of claim 15 wherein said front bed portion arches forward and down from said hinge.

26. The truck bed of claim 15 wherein when said rear bed portion is lowered into an unloading position, said truck bed forms a continuous curve.

27. The truck bed of claim 1 wherein said front bed portion arches forward and down from said hinge.

* * * * *